US005398495A

United States Patent [19]

Ciccia et al.

[11] Patent Number: 5,398,495

[45] Date of Patent: Mar. 21, 1995

[54] COMBUSTION CHAMBER WITH VARIABLE OXIDIZER INTAKES

[75] Inventors: Patrick S. A. Ciccia, Paris; Eric J. S. Lancelot, Melun, both of France

[73] Assignee: Societe Nationale d'Etude et de Construction de Moteurs d'Aviation (S.N.E.C.M.A.), Paris, France

[21] Appl. No.: 228,367

[22] Filed: Apr. 15, 1994

[30] Foreign Application Priority Data

Apr. 29, 1993 [FR] France ................................ 93.05061

[51] Int. Cl.[6] ............................ F02C 9/00; F23R 3/26

[52] U.S. Cl. .................................... 60/39.23; 60/39.37

[58] Field of Search ..................... 60/39.23, 39.29, 747, 60/748, 752, 760, 39.37

[56] References Cited

U.S. PATENT DOCUMENTS

| | | | |
|---|---|---|---|
| 3,078,672 | 2/1963 | Meurer | 60/39.23 |
| 3,490,230 | 1/1970 | Pillsbury et al. | 60/39.23 |
| 3,577,878 | 5/1971 | Greenwood | 60/39.23 |
| 3,952,501 | 4/1976 | Saintsbury | 60/39.23 |
| 4,766,722 | 8/1988 | Bayle-Laboure et al. | 60/752 |
| 5,159,807 | 11/1992 | Forestieer | 60/39.23 |
| 5,317,863 | 6/1994 | Ciccia et al. | 60/39.23 |

FOREIGN PATENT DOCUMENTS

| | | | |
|---|---|---|---|
| 0100135 | 2/1984 | European Pat. Off. . | |
| 2133832 | 12/1972 | France . | |
| 265602 | 10/1913 | Germany | 60/39.23 |

*Primary Examiner*—Timothy S. Thorpe

*Attorney, Agent, or Firm*—Bacon & Thomas

[57] ABSTRACT

A generally annular combustion chamber for a gas turbine engine is disclosed having fuel injector assemblies, each with an oxidizer swirler, extending through an upstream end wall of the combustion chamber and control means connected to the control diaphragms of the oxidizer swirlers in order to move the control diaphragms between maximum and minimum flow positions. The upstream end wall of the combustion chamber defines complementary oxidizer intake orifices which have movable closure plates to selectively open or close the complementary oxidizer intake orifices. A mechanical linkage connects the closure plates to the control diaphragm of an adjacent air swirler such that, when the control diaphragms are in their maximum flow positions, the closure plates close the complementary oxidizer intake orifices, and when the control diaphragms are in their minimum flow positions, the closure plates are moved such that the complementary oxidizer intake orifices are fully open.

10 Claims, 3 Drawing Sheets

COMBUSTION CHAMBER WITH VARIABLE OXIDIZER INTAKES

BACKGROUND OF THE INVENTION

The present invention relates to an annular combustion chamber for a gas turbine engine, such as a turbojet aircraft engine, more particularly such a combustion chamber having variable oxidizer intakes.

Generally annular combustion chambers for gas turbine engines are known which have fuel injectors associated with oxidizer swirlers located in an upstream end of the combustion chamber in order to inject fuel and oxidizer into the combustion chamber burning zone. The oxidizer swirlers impart a swirling motion to the incoming oxidizer in order to increase its mixing with the injected fuel. The oxidizer swirlers may be equipped with control diaphragms to control the cross sectional areas of the oxidizer swirler opening in order to control the amount of oxidizer passing into the combustion chamber.

Such known oxidizer swirlers with control diaphragms find particular use in aircraft turbojet engines which must experience extremely different modes of operation. At low engine power, a long dwell time of the combustion gases in the combustion zone are required to stabilize combustion, and to reduce the emission of carbon monoxide and unburnt hydrocarbons. On the contrary, under full power operating modes, the dwell time of the combustion gases in the combustion chamber must be relatively short in order to reduce nitrogen oxide emissions.

Known controllable oxidizer swirlers generate a large pressure drop in the oxidizer as it passes through the swirler into the combustion chamber. This causes a pressure buildup upstream of the oxidizer swirler which may overload the oxidizer compressor, which is utilized to supply the oxidizer to the combustion chamber. This consequently lowers the engine efficiency.

SUMMARY OF THE INVENTION

A generally annular combustion chamber for a gas turbine engine is disclosed having fuel injector assemblies, each with an oxidizer swirler, extending through an upstream end wall of the combustion chamber and control means connected to the control diaphragms of the oxidizer swirlers in order to move the control diaphragms between maximum and minimum flow positions. The upstream end wall of the combustion chamber defines complementary oxidizer intake orifices which have movable closure plates to selectively open or close the complementary oxidizer intake orifices. A mechanical linkage connects the closure plates to the control diaphragm of an adjacent air swirler such that, when the control diaphragms are in their maximum flow positions, the closure plates close the complementary oxidizer intake orifices, and when the control diaphragms are in their minimum flow positions, the closure plates are moved such that the complementary oxidizer intake orifices are fully open.

The complementary oxidizer intake orifices may extend through the upstream end wall adjacent to one or both of the outer and inner walls defining the generally annular combustion chamber. The closure plates are slidably attached to the upstream end wall outside of the combustion zone and are mechanically connected to an adjacent control diaphragm such that movement of the control diaphragm also moves the closure plates. A control rod may be mechanically connected to adjacent control diaphragms such that movement of a single control rod controls the positioning of both of the control diaphragms, as well as their respective closure plates.

In an alternative embodiment, internal walls are located within the combustion chamber which extend parallel to the outer and inner walls. The internal walls are located such that the complementary oxidizer intake orifices communicate with the combustion chamber between the internal wall and an outer wall, as well as between and internal wall and the inner wall, respectively.

DETAILED DESCRIPTION OF THE PREFERRED EMBODIMENTS

Figure 1:
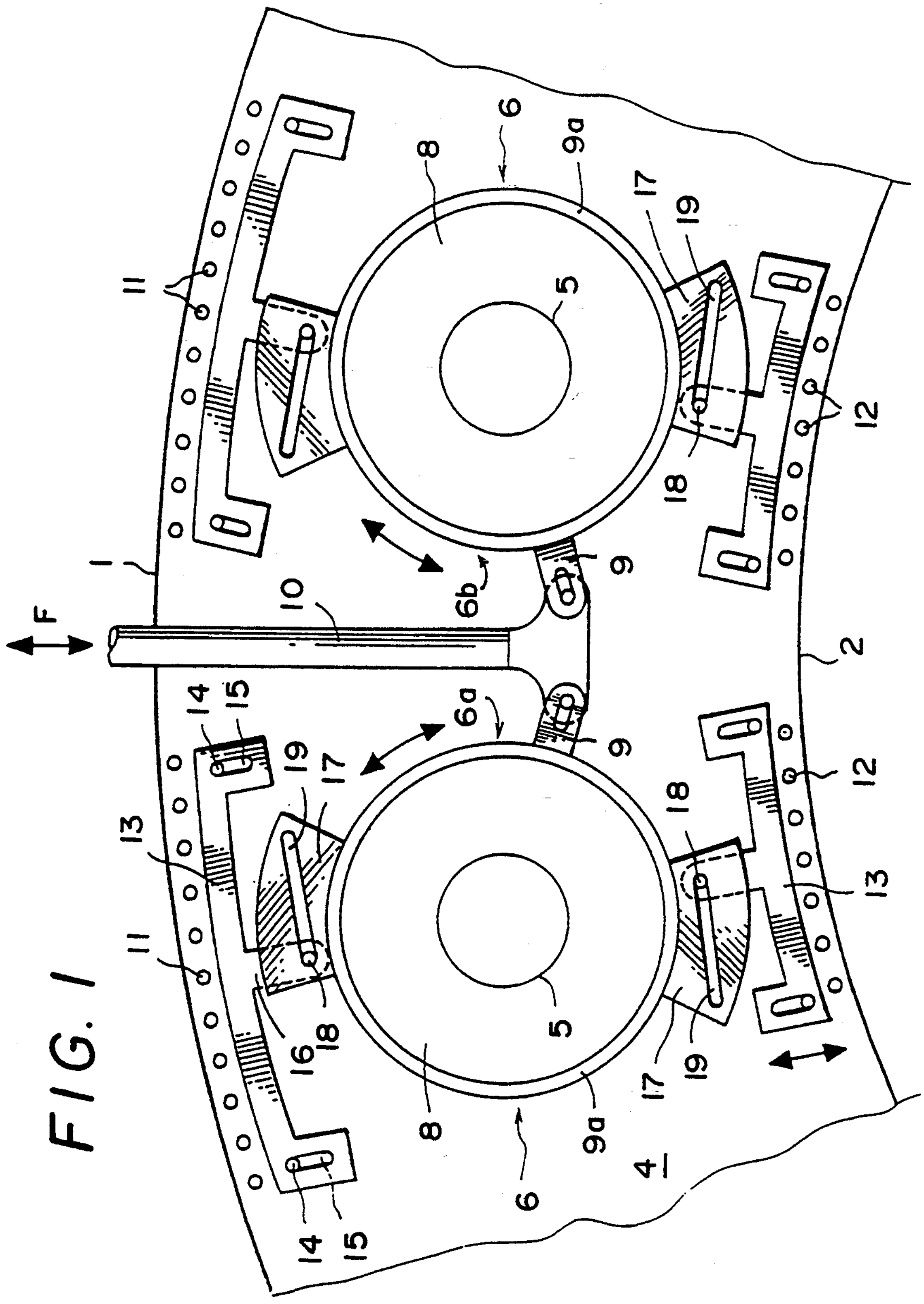
FIG. 1 is a partial, front view of an annular combustion chamber incorporating the present invention illustrating the closure plates in their open positions.

The annular combustion chamber according to the present invention comprises outer wall 1 and inner wall 2 which between them define the combustion zone and both of which are bodies of revolution extending about a central axis (not shown). Upstream end wall 4 connects the outer and inner walls 1 and 2 and defines the upstream end of the combustion chamber.

A plurality of fuel injectors 5 extend through the upstream end wall 4 and may be circumferentially spaced around the central axis. Each of the fuel injectors 5 has an oxidizer swirler 6 associated therewith. The fuel injector assemblies comprising fuel injectors 5 and oxidizer swirlers 6, extend through apertures 7 in the upstream end wall 4. Each swirler 6 has a control diaphragm 8 movable between minimum flow and maximum flow positions to adjust the magnitude of the oxidizer air passing into the combustion chamber through the swirlers 6. The control diaphragm 8 is mechanically connected to a control rod 10 via control levers 9. Movement of the control rod 10 in the direction of arrows F, illustrated in FIGS. 1 and 2, cause pivoting motion of diaphragm collar *9a* to control the opening of the oxidizer holes of the diaphragm 8. The construction of the control diaphragm 8 and rotatable collars *9a*, per se, are well known in the art and need not be further described. Preferably, each control rod 10 is mechanically connected to two adjacent oxidizer swirlers *6a* and *6b*.

Adjacent to each of the fuel injectors 5 and located in approximately the same radial plane, the upstream end wall 4 defines a plurality of first complementary oxidizer intake orifices 11 which are located adjacent to the outer wall 1 and which communicate with the combustion chamber interior. The upstream end wall 4 may also define a second plurality of complementary oxidizer intake orifices 12 which are located adjacent to the inner wall 2 and which also communicate with the interior of the combustion chamber. Closure plates 13 are slidably attached to the upstream side of the upstream end wall 4 and are guided by guide pins 14, affixed to the upstream end wall 4, engaging elongated radial slots 15. As can be seen, the closure plates 13 are movable in a radial direction with respect to the central axis of the annular combustion chamber.

Each closure plate 13 comprises a tab 16 which extends toward the fuel injector 5 and which has a pin 18 extending longitudinally therefrom. The pin 18 contacts an oblique surface defined by elongated oblique slot 19 defined by lug 17. Lug 17 is fixedly attached to and extends from the control diaphragm collar 9*a* such that it pivots or rotates with the collar 9*a*. The elongated slot 19 extends obliquely to a radius of the annular combustion chamber extending from the central axis. Both the lug 17 and the closure plates 13 extend substantially parallel to the plane of the upstream end wall 4.

Figure 3:
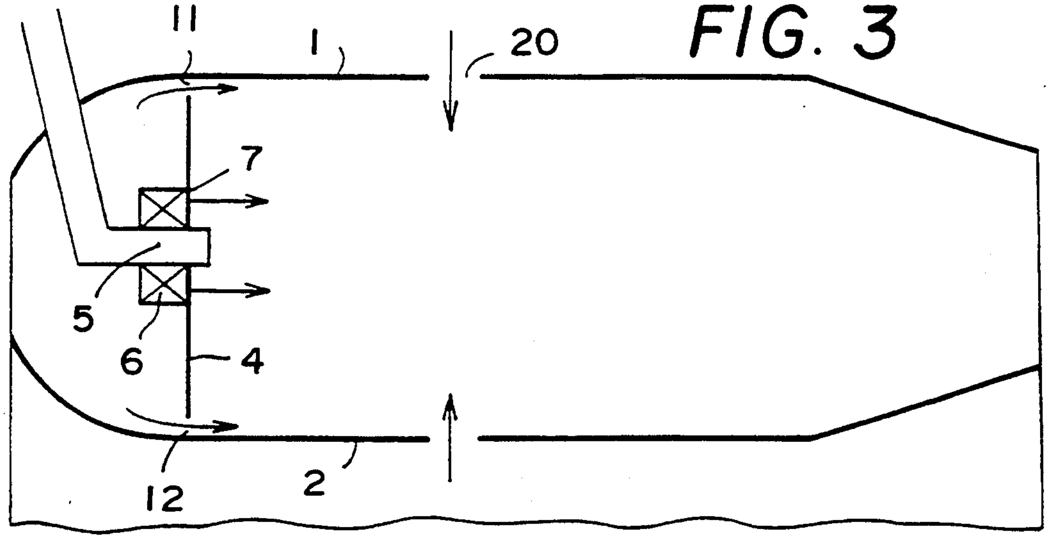
FIG. 3 is a schematic, cross-sectional view of an annular combustion chamber incorporating the present invention with the elements in their positions illustrated in FIG. 1.

As can be seen, when the control rod 10 moves in one of the directions of arrow F, the diaphragm control collars 9*a* of the two adjacent oxidizer swirlers 6*a* and 6*b* are rotated in opposite directions and the closure plates 13 are simultaneously moved in radial directions. FIGS. 1 and 3 illustrate the configuration of the invention in the low power engine operating mode wherein the oxidizer diaphragm control collars 9*a* are in their minimum flow positions thereby allowing only a minimum oxidizer flow into the combustion chamber. This minimal oxidizer flow suffices to burn the small amount of fuel flowing through the injectors 5 to provide optimum low-power operating conditions. In this configuration, the closure plates 13 are in their opened positions thereby completely uncovering the complementary oxidizer intake orifices 11 and 12. The oxidizer located upstream of the upstream end wall 4 passes through the complementary oxidizer intake orifices 11 and 12 into the combustion chamber, thereby preventing overloading of the oxidizer compressor and enabling the oxidizer passing through the orifices 11 and 12 to cool the walls 1 and 2 of the combustion chamber without directly taking part in the burning of the injected fuel.

Figure 2:
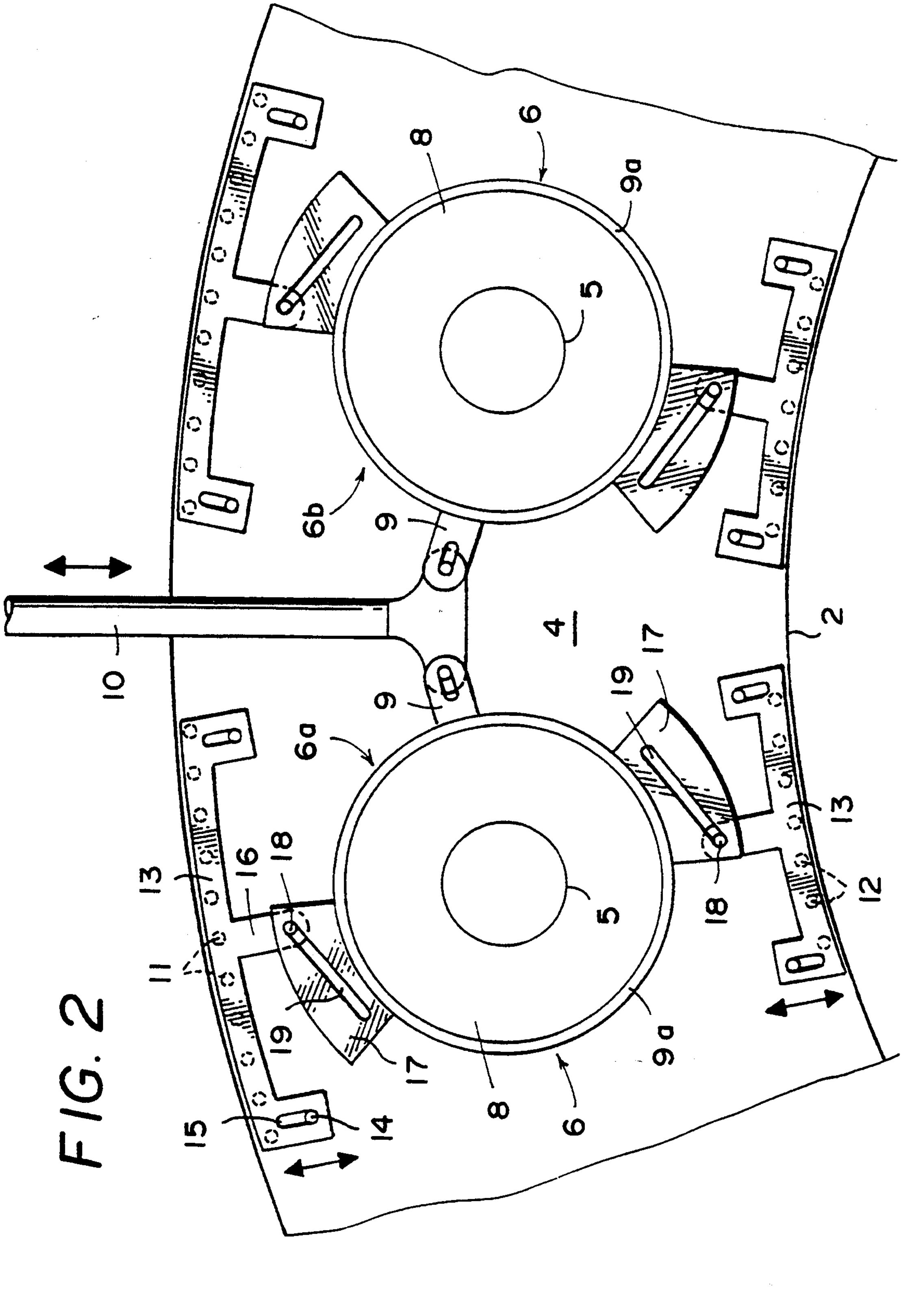
FIG. 2 is a partial, front view, similar to FIG. 1, illustrating the closure plates in their closed positions.
Figure 4:
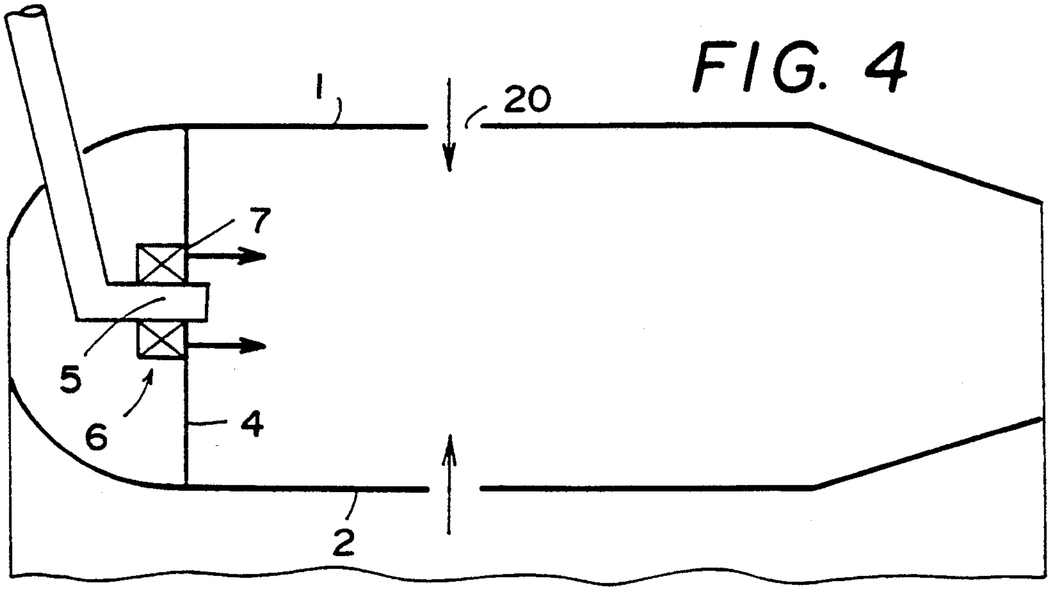
FIG. 4 is a schematic, cross-sectional view similar to FIG. 3, illustrating the oxidizer flow when the elements are in their positions shown in FIG. 2.

FIGS. 2 and 4 show the configuration of the invention under full power operating conditions. In this configuration, the oxidizer swirlers 6 are in their maximum flow positions in order to supply the maximum amount of oxidizer to the high fuel flow to provide optimal high power conditions. In this configuration, the closure plates 13 completely close the complementary oxidizer intake orifices 11 and 12. In known fashion, the outer and inner walls 1 and 2 define primary oxidizer intake orifices 20 to enable oxidizer to enter the combustion chamber.

Figure 5:
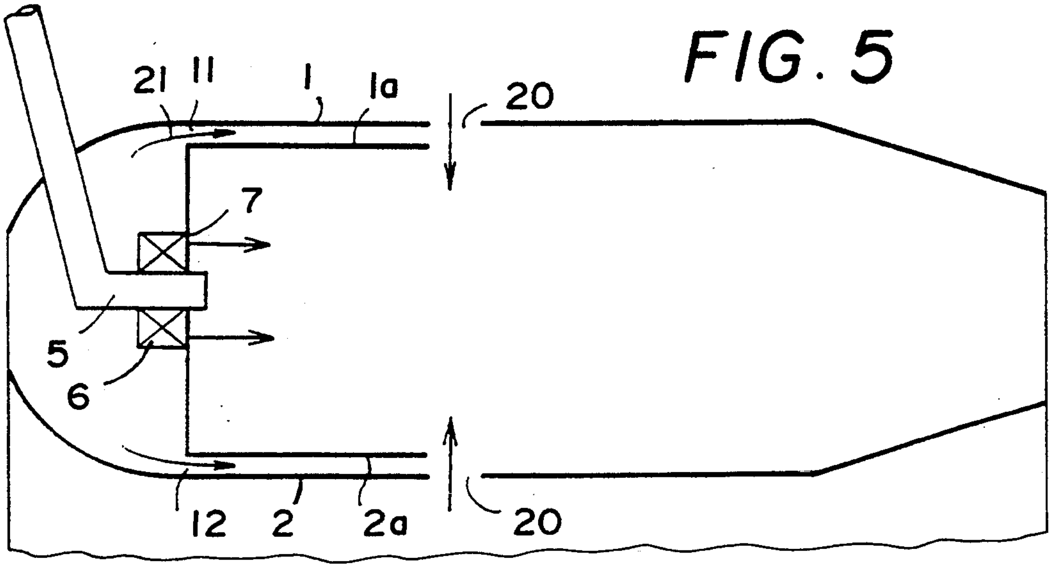
FIG. 5 is a schematic, cross-sectional view illustrating an alternative embodiment of the present invention.

An alternative embodiment of the present invention is illustrated in FIG. 5. In this embodiment, the oxidizer 21 flowing through the complementary oxidizer intake orifices 11 and 12 is guided along the inner surfaces of the outer and inner walls 1 and 2, respectively, by internal walls 1*a* and 2*a*. As can be seen, the internal walls 1*a* and 2*a* are spaced from the outer wall 1 and the inner wall 2, respectively, such that the complementary oxidizer intake orifices 11 and 12 communicate with the combustion chamber via the space between the walls. The oxidizer 21 guided by the internal walls cools the outer and inner walls 1 and 2, respectively, by convection and is also prevented from taking part in the combustion of the fuel in the combustion zone which would degrade the effect of the invention by making the oxidizer/fuel mixture leaner in the combustion zone.

The present invention improves the combustion both at low power and full power operating modes by directly matching the oxidizer flow to that of the combustion. As a result, unburnt hydrocarbons and carbon oxides are reduced at low power operating conditions, and nitrous oxide emissions are reduced at full power conditions. Because the flow of oxidizer is reduced at the oxidizer swirlers 6, the rate at which oxidizer takes part in the combustion in the combustion chamber is lowered, thereby increasing flame stability and enhancing re-ignition in the case of a flame out. Furthermore, by reducing the pressure differential across the upstream end wall of the combustion chamber, the overload of the oxidizer compressor is eliminated, thereby increasing engine efficiency.

The foregoing description of the invention is presented for illustrative purposes only and should not be construed as in any way limiting this invention, the scope of which is defined solely by the appended claims.

We claim:

1. A generally annular combustion chamber for a gas turbine engine, the combustion chamber having an outer wall, an inner wall and an upstream end wall connecting the outer and inner walls, and comprising:

a) at least one fuel injector assembly located on the upstream end wall to inject fuel and allow oxidizer to pass into the combustion chamber, the fuel injector assembly having an oxidizer intake swirler with a control diaphragm movable between maximum and minimum flow positions;

b) control means operatively connected to the control diaphragm to move the control diaphragm between its maximum and minimum flow positions;

c) a complementary oxidizer intake orifice in the upstream end wall located adjacent to one of the outer and inner walls so as to communicate with the combustion chamber;

d) a closure plate slidably attached to the upstream end wall so as to move in a generally radial direction with respect to the generally annular combustion chamber movable between an open position wherein the complementary oxidizer intake orifice is open and a closed position wherein the complementary oxidizer intake orifice is closed; and, e) connecting means mechanically connecting the closure plate and the control diaphragm such that, when the control diaphragm is in its maximum flow position the closure plate is in its closed position and when the control diaphragm is in its minimum flow position, the closure plate is in the open position.

2. The combustion chamber of claim 1 wherein the connecting means comprises:

a) a lug extending from one of the closure plate and the control diaphragm, the lug having a surface extending obliquely to a radius of the generally annular combustion chamber; and, b) a pin extending from the other of the closure plate and the control diaphragm so as to bear against the oblique surface.

3. The combustion chamber of claim 2 wherein the lug extends substantially parallel to the upstream end wall.

4. The combustion chamber of claim 2 wherein the lug extends from the control diaphragm.

5. The combust ion chamber of claim 2 wherein the lug has an elongated slot forming the oblique surface.

6. The combustion chamber of claim 1 further comprising: a) first and second complementary oxidizer intake orifices in the upstream end wall adjacent to the inner and outer walls, respectively;

b) a first closure plate slidably attached to the upstream end wall so as to move in a generally radial direction with respect to the generally annular combustion chamber so as to open and close the first complementary oxidizer intake orifices: and, c) a second closure plate slidably attached to the upstream end wall so as to move in a generally radial direction with respect to the generally annular combustion chamber so as to open and close the second complementary oxidizer intake orifice.

7. The combustion chamber of claim 6 wherein the connecting means comprises:

a) a first lug extending from one of the first closure plate and the control diaphragm, the first lug having a first oblique surface extending obliquely to a radius of the generally annular combustion chamber;

b) a first pin extending from the other of the first closure plate and control diaphragm so as to bear against the first oblique surface;

c) a second lug extending from one of the second closure plate and the control diaphragm, the second lug having a second oblique surface extending obliquely to a radius of the generally annular combustion chamber; and, d) a second pin extending from the other of the second closure plate and control diaphragm so as to bear against the second oblique surface.

8. The combustion chamber of claim 7 wherein the first and second lugs extend substantially parallel to the upstream end wall.

9. The combustion chamber of claim 7 wherein the first and second lugs extend from the control diaphragm.

10. The combustion chamber of claim 7 wherein the first and second lugs have first and second elongated slots, respectively forming the first and second oblique surfaces.

* * * * *